United States Patent Office 2,909,451
Patented Oct. 20, 1959

2,909,451

PROCESS FOR PREPARING ALUMINUM PHOSPHATE DISPERSION AND PROCESS OF TREATING PILE FABRIC WITH THE RESULTING DISPERSION

Edward B. Lawler, Charlotte, N.C., and Richard D. Vartanian, Bound Brook, and Philip B. Roth, Somerville, N.J., assignors to American Cyanamid Company, New York, N.Y., a corporation of Maine No Drawing. Application April 27, 1956
Serial No. 581,001

12 Claims. (Cl. 117—169)

The present invention relates to a process for preparing an aluminum phosphate-containing composition, the composition itself, the method of treating surfaces with said compositions to improve their resistance to soiling and to impart other properties thereto, and the materials which have been so treated.

The composition of the present invention is effective to improve the resistance to soiling or reduce the adherence or attraction of soil particles to fabric (flat and pile), paper and paper-like materials, paint films and the like. In addition, the composition of the present invention is effective as a delustering agent for textile materials.

In the textile field and particularly in the rug industry, where in recent years widespread usage has been made of pastel colors, and the number of non-wool rugs, including blends of wool which tend to soil more readily than wool have greatly increased, the need for an effective durable soil retardant has been emphasized.

It has been determined, generally, that fibers have small irregularities in their surfaces. These irregularities function as cavities which collect dirt and dirt particles, and they tend to increase in number as their size decreases. Thus, it would be expected that smaller soil particles, particularly those measuring less than a micron, would be retained tenaciously in greater numbers than larger particles. This retention of soil particles in addition to soiling produces color change in the fiber or fabric and other undesirable effects.

The function of soil retardant particles therefore appears to be to fill imperfections in the fiber surface, making it relatively smooth. In this way it functions as a soil barrier. Thus, once a carpet is saturated with a soil retardant, all subsequent impinging soil finds no unoccupied sites. The dirt cannot become firmly attached, and it is loosely held by the pile in the case of a pile rug or falls to the bottom of the carpet. In either case, it is easily removed as by vacuuming.

Soil retardant materials and their soil retardant finishes heretofore known have appreciably whitened the surface to which they were applied, have dusted, produced a "harsh-hand," yellowed and have been lacking in durability.

Therefore, it is an object of the present invention to provide a soil retardant which reduces the adherence or attraction of soil particles to a surface, thus reducing color change and other undesirable effects of soiling. It is a further object to provide a soil retardant finish that does not yellow on ageing, will not whiten a surface when applied in effective amounts, is durable, and does not appreciably increase the harshness of the hand when used on fabric and particularly pile fabric of the type found in rugs.

These and other objects and advantages will become apparent as the present invention is set forth more fully hereinbelow.

The soil retardant composition of the present invention used to impart improved soil-resistant finishes is an aqueous colloidal dispersion of negatively charged particles produced by reacting a water-soluble aluminum salt and at least a stoichiometric amount of a water-soluble orthophosphate in an aqueous medium to produce a precipitate. The insoluble precipitate formed is then filtered, washed, and dispersed in water. The pH of the resulting dispersion is then adjusted if necessary to between 4 and 10.5 and preferably to between 5.5 and 8.5 and is thereafter passed through a micro mill or other suitable milling or grinding device.

The major portion of particles in the dispersion are 1.0 micron and less in diameter. Frequently, the individual particles aggregate and thus the function of the colloid mill or other similar device, in addition to reducing the coarse particles, is to break up aggregates formed so that a working particle size of 1.0 micron and less may be realized for a major portion of the particles.

After filtering the precipitate, and washing the filter cake, the said filter cake is dispersed in water. This is accomplished by means of a water-soluble phosphate selected from the group consisting of metaphosphates, pyrophosphates, polyphosphates and mixtures thereof. These dispersing phosphates may already be present in the filter cake as a result of having been added to the aqueous medium at the time of the initial reaction between the water-soluble aluminum salt and the water-soluble orthophosphate, either by being added independently to said medium or in conjunction with the orthophosphate, or they may be added to the wet filter cake, or they may be added to the aqueous medium after the filter cake has been placed therein. Thus, the expression "dispersing the filter cake in water" as it is used herein is intended to include the concept that the dispersing phosphates may be added or they may be present at any of the three stages enumerated above or any combinations thereof. It is preferred, however, that the dispersing phosphate be present at the time of the reaction between the water-soluble aluminum salt and the water-soluble orthophosphate, primarily as a matter of convenience.

As noted above, after the initial reaction and the formation of the precipitate, the dispersion is filtered in order to remove some of the soluble salts formed as a result of said reaction. As will hereinafter more fully appear, it is desirable that some of the soluble salts so formed remain in admixture with the precipitate. However, if excesses are present, the quality of the dispersion is impaired.

Among the suitable soluble dispersing phosphates are tetrasodium pyrophosphate, sodium tripolyphosphate $$(Na_5P_3O_{10})$$

sodium metaphosphate, ammonium metaphosphate, sodium polyphosphate, $(Na_{12}P_{10}O_{31})$ and the like. The metaphosphates, as in the case of sodium metaphosphate, are preferably written as $(NaPO_3)_x$ and is intended to include the di, tri, tetra, penta and hexa metaphosphate and the like. These compounds and mixtures thereof may be designated as condensed phosphates, which term includes both linear and cyclic metaphosphates. The phosphate salts of other metals such as potassium and the like may be employed where they function as dispersing agents and are water soluble.

The preferred water-soluble aluminum salt is aluminum chloride, although aluminum sulfate, aluminum nitrate, aluminum acetate, aluminum formate and the like or mixtures thereof may be used. Preferred water-soluble orthophosphates are trisodium phosphate and diammonium hydrogen phosphate.

The amount of soluble dispersing phosphate used must be sufficient to be effective as a dispersing agent, i.e. maintain a major portion of the particles of precipitate in a dispersed state. When added at the time of the initial reaction, these phosphates may be used in amounts in excess of that required to produce a good dispersion, as long as the amount does not interfere with the formation of a precipitate. A suitable quantity of phosphate dispersing agent is between .15% and .80% based on the weight of the total slurry at the time of the initial reaction. From .40% to .70% is the preferred amount of dispersing phosphate, based on the weight of the total slurry. Based on the weight of the wet filter cake, between about 1.5% and about 10% of the dispersing phosphate is most effective.

When the amount of dispersing phosphate added to the slurry at the time of the original strike is of a lower order of magnitude, as for example .15 to .260%, subsequent additions of as much as 2% based on the weight of the wet filter cake are desirable to insure a good final dispersion.

A particularly desirable orthophosphate is diammonium hydrogen phosphate, which when reacted with the aluminum salt such as aluminum chloride is believed to form at least in part a sparingly soluble double salt having the composition $AlPO_4.NH_4H_2PO_4$, which produces an increased yield of insoluble aluminum phosphate. Dispersions in which aluminum phosphate and ammonium dihydrogen phosphate double salts are believed to be present as precipitate have been found to be particularly effective in reducing soiling.

After the reaction between the aluminum salt and the orthophosphate, the reaction medium is filtered. In order to facilitate the filtration of the precipitate, minor amounts of the order of ¾ to 1¼% of the weight of the slurry of a flocculating agent such as a water-soluble inorganic salt of a metal selected from the group consisting of aluminum, magnesium, calcium, or zinc or mixtures thereof may be added. Aluminum, magnesium, calcium and zinc chlorides; aluminum, magnesium, and zinc sulfates are examples of such salts. Preferably, the amount of flocculating agent is 1% of the weight of the slurry. In addition to functioning as flocculating agents, the use of these materials improves the stability of the final product against irreversible gelling. As will be apparent, the addition of such flocculating agents are most desirable when dispersing phosphates have been added at the time of the initial strike, since the dispersing phosphates will otherwise tend to keep the insoluble phosphate precipitate in a dispersed condition. Filtration is to remove at least partially the soluble salts formed during the reaction between the soluble aluminum salts and soluble orthophosphate.

These materials, if present in sufficiently large quantities, impair the quality of the dispersion. In addition to filtering, it is necessary to wash the residue or filter cake after filtration with a limited amount of water to reduce the occluded soluble salt content thereof. While a high occluded salt content in the residue impairs the quality of the final dispersion, it is preferred not to wash the residue or filter cake completely free of such salts since the presence of minor amounts of such salts facilitates the filtration and permits ready removal of the cake from the filter. Amounts of wash water up to 75% of the volume of the slurry have been found to be suitable for this purpose, with wash water equal to between 10 and 50% of the volume of the slurry preferred.

After filtration and washing of the residue, the residue is stirred into an aqueous medium where, if dispersing phosphates were not added at the time of the original strike, or if a substantial portion of the dispersing phosphates washed through into the filtrate, additional dispersing phosphates may be added. Additionally, these dispersing phosphates may be added to the wet filter cake.

To render the dispersion stable, its pH may be adjusted to between 4 and 10.5 and preferably to between 5.5 and 8.5 by the addition of sodium hydroxide or other base materials if necessary. In many instances, where the dispersion already has a pH within this range, this additional step is not necessary.

This occurs most frequently when dispersing phosphates are added after the filter cake is reslurried. In such an instance, the dispersing phosphates function to adjust the pH to within the desired range. In addition to stabilizing the dispersion, the presence of an alkali, such as sodium hydroxide, functions as a peptizing agent, which in conjunction with the dispersing phosphates maintain the insoluble phosphate particles in a highly dispersed state.

After stabilizing the dispersion, it is preferably rendered thixotropic by the addition of a small amount of a water-soluble inorganic salt of a metal selected from the group consisting of aluminum, magnesium, calcium, or zinc, or mixtures thereof. In addition to functioning in this capacity, these salts improve the stability of the final product against irreversible gelling.

Aluminum, magnesium, calcium and zinc chlorides and aluminum, magnesium and zinc sulfates are examples of such salts. Thereafter, the dispersion is run through a micro mill or other suitable grinding or milling device to obtain a uniform product, the particle size of a major portion of the particles therein being 1.0 micron and less in diameter.

While the phosphate dispersion above described may be used alone as a soil retardant, good results have been obtained by combining them with dispersions of colloidal silica and/or colloidal titania. In addition, softening agents, such as Carbowax 4000 (polyethylene glycol having a molecular weight of 4000) or the like may be incorporated in the dispersion to provide a softer hand if desired.

To further illustrate the present invention, the following examples are given primarily by way of illustration. Specific details set forth therein should not be construed as limitations on the present invention, except as they appear in the appended claims. All parts and percentages are by weight unless otherwise designated.

EXAMPLE 1

Into a suitable reaction vessel there were introduced 91.2 parts of aluminum chloride $AlCl_3.6H_2O$ (.378 mole) in 1950 parts of water. With constant stirring, a solution consisting of 7.5 parts (.028 mole) of tetrasodium pyrophosphate, 144 parts (.378 mole) of trisodium phosphate ($Na_3PO_4.12H_2O$) and 1140 parts of water were slowly added. With stirring, a solution consisting of 30 parts of calcium chloride (80% real) and 270 parts of water were added. The stirring was continued for about 1 hour. The resultant slurry was then transferred to a Büchner funnel, filtered with suction and thereafter washed with a volume of water equal to one third the volume of the slurry. Two parts of sodium metaphosphate were then stirred into 100 parts of the filter cake, which was then dispersed in order to give a thixotropic colloidal dispersion.

EXAMPLE 2

Thirty-five parts of aluminum chloride $AlCl_3.6H_2O$ (.145 mole) were dissolved in 1500 parts of water. To this solution a solution consisting of 68 parts (.515 mole) of diammonium hydrogen phosphate and 1900 parts of water were slowly added with constant stirring. A solution consisting of 45 parts of calcium chloride (80% real) and 405 parts of water was then added and stirring continued for about 1 hour. This slurry was then transferred to a Büchner funnel, filtered with suction and the filter cake washed with a volume of water equal to one third the volume of the slurry. A filter cake having a calcined solids of 20% and a pH of 5 was obtained. Five parts of sodium metaphosphate $(NaPO_3)_x$ and 10 parts of water were stirred into 50 parts of the filter cake to give a fluid colloidal dispersion. Thereafter, the pH of the dispersion was adjusted to 6.5 by the addition of sodium hydroxide.

Ten parts of the finished product were dispersed in 88 parts of water and stirred. Into this dispersion one part of a methylated trimethylol melamine resin and one part of a 10% solution of magnesium chloride were added. This solution was applied to nylon taffeta by means of a padding process and the resultant fabric dried and given a heat cure of 1½ minutes at 350° F. The resultant fabric appears dull and delustered as compared with the corresponding untreated samples.

EXAMPLE 3

In a suitable reaction vessel 750 parts of a 28% solution of aluminum chloride (1.58 moles) were diluted with 8400 parts of water. With high speed agitation, a solution consisting of 35.2 parts of tetrasodium pyrophosphate and 1000 parts of water were added followed by a solution consisting of 600 parts (1.58 moles) of trisodium phosphate ($Na_3PO_4.12H_2O$) and 2400 parts of water. This mixture was stirred for 1 hour before being transferred to a Büchner funnel and suction filtered. Thereafter, the filter cake was washed with a volume of water equal to one third the volume of the slurry. The aluminum phosphate filter cake had a calcined solids content of 12.2%.

To 450 parts of filter cake, 9 parts of tetrasodium pyrophosphate were added and the dispersion was given one pass through a micro pulverizer using a screen with 0.02" diameter holes. The milled dispersion had a pH of 6.8 and gave a fine colloidal dispersion on dilution with water.

Ten parts of the finished product prepared as above were dispersed in 90 parts of water and transferred to a shallow container. A wool rug was submerged in this dispersion, care being taken to wet only the rug pile and to obtain a wet add-on of approximately 50% of the weight of the rug pile. The rug was then dried at 100° C. in a force draft oven.

The treated piece and an untreated control piece were then fastened to a 5" x 5" window in a revolving drum for the purpose of exposing the treated and control pieces to soiling. Two grams of synthetic soil were placed in the perforated axle of the drum and seventeen ½-inch steel balls and eighteen ¼-inch steel balls were placed in the said drum. The opening in the drum was closed and was rotated for 20 minutes. The samples were then removed and vacuumed as with a typical household vacuum cleaner. The treated sample was compared with the control in order to evaluate the effectiveness of the treatment for imparting soil resistance thereto. The treated rug shows good soil resistance, appearing significantly cleaner than the untreated sample and was not whitened by the treatment.

EXAMPLE 4

Into a suitable reaction vessel there were introduced with stirring 16.5 parts of a dispersion containing 30% colloidal silica and 2.4 parts of Carbowax 4000. To this dispersion 81.1 parts of the product produced according to Example 3 were added. The resulting colloidal dispersion had a pH of 7.1.

Ten parts of the above mixture were diluted with 90 parts of water and was applied by dipping a sample of wool rug therein, said sample and an identical untreated control sample were then further processed as described in Example 3. The treated rug shows good soil resistance and was not whitened by the treatment.

EXAMPLE 5

In a suitable reaction vessel 150 parts of a product prepared according to Example 1 were mixed with 50 parts of a negatively charged colloidal titanium hydrous oxide dispersion consisting of 9 parts of hydrous titania oxide, .5 part of anhydrous citric acid, 3.2 parts of trisodium phosphate and 37.3 parts of water. This product dispersed readily in water to give a fine colloidal dispersion.

Ten parts of this composition were diluted with 90 parts of water and applied to a wool rug as described in Example 4 and the treated rug showed good soil resistance and was not whitened by the treatment.

EXAMPLE 6

In a suitable reaction vessel 132 parts (.198 mole) of aluminum sulfate $Al_2(SO_4)_3.18H_2O$ were dissolved in 2100 parts of water. With stirring a solution consisting of 15 parts of tetrasodium pyrophosphate, 150 parts (.396 mole) of trisodium phosphate, $Na_3PO_4.12H_2O$ and 950 parts of water were added. The precipitated slurry was then transferred to a Büchner funnel, suction filtered, and washed with a volume of water equal to one half the volume of the slurry. The yield obtained was 380 parts of filter cake having a pH of 7.2 and a calcined solids content of 15%.

A solution containing 1.5 parts of $MgCl_2.6H_2O$ and 10 parts of water were stirred into 300 parts of filter cake. This dispersion was given one pass through a micro pulverizer using a screen of 0.02" diameter holes. The resultant product is a thixotropic colloidal dispersion having a pH of 6.5.

This dispersion was applied as described in Example 3 to a rayon rug with the exception that five parts of concentrated dispersion and 95 parts of water were used. The treated rug showed good soil resistance and was not appreciably whitened by the treatment.

EXAMPLE 7

In a suitable reaction vessel 132 parts (.198 mole) of aluminum sulfate $Al_2(SO_4)_3.18H_2O$ were dissolved in 2100 parts of water. With stirring a solution consisting of 15 parts of tetrasodium pyrophosphate, 150 parts (.396 mole) of trisodium phosphate, and 950 parts of water were added. To the resulting precipitated slurry, a solution consisting of 30 parts of calcium chloride and 270 parts of water were added. The flocculated slurry was then transferred to a Büchner funnel, suction filtered, and the filter cake washed with a volume of water equal to one half the volume of the slurry. The yield obtained was 440 parts of filter cake having a pH of 6.8 and a calcined solids of 14.5%.

Four hundred parts of the filter cake was dispersed and 1 part of $MgCl_2.6H_2O$ and 10 parts of water were added to the dispersion to confer thixotropy. The dispersion is then given one pass through a micro pulverizer using a screen with 0.02" diameter holes.

The resulting product was a colloidal thixotropic dispersion having a pH of 6.5.

This dispersion was applied to a rayon rug as in Example 3 with similar results.

EXAMPLE 8

A procedure similar to that described in Example 7 was followed with the exception that 18 parts of sodium tripolyphosphate $Na_5P_3O_{10}(5Na_2O:3P_2O_5)$ was substituted for the 15 parts of tetrasodium pyrophosphate. A yield of 430 parts of filter cake having a pH of 6.7 and a calcined solids of 14.5% was obtained.

A solution consisting of one part of $MgCl_2.6H_2O$ and 10 parts of water were stirred into 400 parts of the filter cake. The dispersion was given one pass through a micro pulverizer using a screen with 0.02" diameter holes. The resultant product was a colloidal thixotropic dispersion having a pH of 6.1.

The dispersion was applied to a rayon rug as in Example 6 with similar results.

EXAMPLE 9

A solution containing on the average about 10% of aluminum chloride and an average of 2.9% sulfuric acid was charged into a suitable container so that the container has 879 parts (6.58 moles) of aluminum chloride and 255 parts of sulfuric acid therein. This amounted to about 8800 parts of said solution. Thereafter, 15,100 parts of water was added to the container to cut the aluminum chloride content to approximately 3.0%.

This mixture was then heated to 40° C. and agitated. Thereafter, the pH of the diluted aluminum chloride solution was adjusted to 3.1 by the addition of 4600 parts of a 5% caustic solution.

25,440 parts of a second solution containing 1070 parts (8.15 moles) of diammonium hydrogen phosphate and 416 parts of ammonium metaphosphate $(NH_4PO_3)_x$ were added to the partially neutralized aluminum chloride solution. The resultant aluminum phosphate slurry had a pH of approximately 4.0.

The slurry was then agitated vigorously for 30 minutes. A solution containing 600 parts of calcium chloride (80% real) and 5400 parts of water were slowly added to the aluminum phosphate slurry with continuous stirring over a period of about 30 minutes. Thereafter, the flocculated aluminum phosphate slurry was filtered and washed by an amount of water equal to 15% of the volume of the slurry over a continuous Oliver filter. The yield obtained was 4600 parts of washed aluminum phosphate filter cake having a calcined solids content of 15.3% or 705 parts of calcined solids.

4514 parts of the washed aluminum phosphate filter cake were then charged into a suitable container and 650 parts of a 30% solution of caustic soda were added to the filter cake to adjust the pH to 8. To this adjusted dispersion 61 parts of magnesium chloride flake $MgCl_2 \cdot 6H_2O$ dissolved in 240 parts of water were added with continuous stirring. This addition renders the dispersion thixotropic and prevents the settling out of solids.

To the thixotropic dispersion 635 parts of water were added to adjust the oven solids of the dispersion to 20%, thereafter the dispersion was passed through an 8-inch micro mill using a 0.020 inch screen and thereafter through a 150–200 mesh stainless steel screen.

The dispersion according to Example 9 is believed to have the following gross composition:

| Ingredient | Percent As is | Percent on Oven Solids Basis |
|---|---|---|
| Aluminum phosphate filter cake | 73.4 | 16.45 |
| Caustic soda to adjust pH | 3.2 | 3.10 |
| Magnesium chloride ($MgCl_2 \cdot 6H_2O$) flakes | 1.0 | 0.45 |
| Water | 22.4 | |
| | 100.0 | 20.00 |

While the dispersions produced according to the present invention have been found to be particularly effective as soil retardant compositions, they have also been found to be highly suited for use as delustering agents and to impart slip resistance to fibers and the like.

The major portion of particles in the dispersion are 1.0 micron and less in diameter. Thus, while some may be molecular in size, others may be of up to 30 and even up to 50 microns in diameter. An analysis of a typical batch of the dispersion of the present invention indicates the following particle size distribution in terms of weight percent.

*Particle size distribution*

| Size Range (Micron) | Weight Percent | Cumulative Weight Percent |
|---|---|---|
| Overflow-0.12 | 23.9 | 23.9 |
| 0.24–0.25 | 4.0 | 27.9 |
| 0.29–0.30 | 6.5 | 34.4 |
| 0.30–0.32 | 1.1 | 35.5 |
| 0.32–0.34 | 7.2 | 42.7 |
| 0.36–0.38 | 9.4 | 52.1 |
| 0.41–0.45 | 13.4 | 65.5 |
| 0.50–0.58 | 9.1 | 74.6 |
| 0.71–1.01 | 0.2 | 74.8 |
| 1.01–∞ | 25.2 | |

This table indicates that about 75 weight percent of the particles in the dispersion are 1.0 micron and less in diameter.

The amount of soil retardant composition used will depend on the type of fiber, construction of fabric, and method of application. Normally, about 0.25%–5% solids based on the weight of the fabric gives satisfactory results. In the case of the pile fabric about .50–3% solids based on the weight of the pile has been found to be effective, with a range of 0.75–1.50% solids being preferred for most purposes.

The dispersion of the present invention may be applied to textile fabrics by spraying, spraying followed by padding, furnishing rolls, immersion, exhaustion techniques, and the like.

Of the methods enumerated above, application by exhaustion is to be preferred, particularly when the base is carpeting and primarily carpeting which may be classifiable as the pile type. Exhaustion techniques are effective on such fabrics where they are composed of rayon, cotton, acetates, wools, synthetic fibers or mixtures thereof and have been found to produce a low soiling index, and, for the most part, a softer hand than when the composition of the present invention is applied by the more conventional techniques of spraying and padding.

While the exact nature of the exhaustion mechanism is not fully understood, it is believed that the materials hereinafter referred to as precipitating agents either charge or induce a charge on said fabric opposite to the negatively charged phosphate dispersion particles, causing the latter to precipitate thereon. A second theory which has been suggested is that the precipitating materials which are added in conjunction with the dispersion of the present invention are attracted to the dispersion particles increasing their size, causing them to precipitate out of the bath onto the fabric.

Agents, or materials which have been found to be adapted to render the fabric attractive to the negatively charged particles of the dispersion of the present invention are certain inorganic salts and cationic surface active agents.

The inorganic salts suitable for use in exhausting the particles of the dispersion of the present invention are those which are water soluble, form acid solutions and which in addition are believed to attach onto or lake onto the fiber to produce or induce a charge attractive to the dispersion particles. Among the salts suited are aluminum acetate, chloride and sulfate, zinc acetate, chloride and sulfate, zirconyl chloride and zirconium acetate and sulfate, stannous chloride and sulfate, stannic chloride and sulfate and antimony chloride. Of the suitable salts enumerated, aluminum sulfate is preferred.

Included in the latter group are aliphatic fatty amines and their derivatives, homologues of aromatic amines having fatty amines derived from aliphatic diamines, quaternary ammonium compounds, amides derived from amino alcohols and their quaternary ammonium derivatives, basic compounds of sulfonium, phosphonium, and antimonium, dimethylphenylbenzyl ammonium chloride, basic salts of ethylene diamine, polyethylene diamines and their quaternary ammonium derivatives, and polypropanol polyethanol amines.

In applying the aluminum phosphate dispersion by exhaustion, salts, dye leveling agents and other contaminants should be removed from the fabric. Thereafter, the fabric is placed in an aqueous bath so that a liquor to cloth ratio of 10–20:1 exists. The precipitating agent is then added to the bath, followed by the phosphate dispersion. In some cases, the precipitating agent may be added first or simultaneously with the phosphate dispersion. The precipitating agent is preferably added in amounts equal to from 0.25 to 20% based on the weight of the fabric, while from between 0.25 to 5% and preferably from between .75 to 3% solids based on the weight of the fabric of the phosphate dispersion is employed.

After application, the fabric is squeezed, as through squeeze rollers to remove excess water and then dried at about 107° C.

When aluminum sulfate is employed as the precipitating agent, preferably from 0.75 to 2% (anhydrous) is used based on the weight of the fabric. The precipitating agents are preferably added to the fabric containing bath and the fabric agitated before the introduction of the phosphate dispersion. When a cationic agent is employed as the precipitating agent, amounts of from 0.5 to 10% based on the weight of the rug are preferred.

Satisfactory treatment by the exhaustion technique is obtained at room temperature. However, somewhat better soil retardancy is obtained if the temperature of the bath is higher. Temperatures up to about 82° C. have been found satisfacory.

The chart set forth hereinbelow clearly demonstrates the improvement in soil resistance and hand of pile fabrics treated by the exhaustion techniques over those treated by padding and spraying techniques. In the exhaustion technique wherein the precipitating agent is aluminum sulfate, a 5" x 5" piece carpet having a viscose fiber pile was agitated for 5 minutes at room temperature in an aqueous bath having a liquor to cloth ratio of 10:1 and containing 1% of said sulfate (anhydrous) based on the weight of the rug. 1.5% solids of the dispersion produced according to the present invention based on the weight of the rug was then added and agitation was continued for 20 minutes. The rug was squeezed out, then dried at about 107° C. Where the precipitating agents are cationic materials similar pieces of carpet were agitated for 20 minutes at room temperature in a bath having a liquor to cloth ratio of 10:1 containing about 5% (35% active) of the cationic material and 1.5% solids of the dispersion of the present invention. These pieces of carpet were then squeezed out and dried at about 107° C. In the padding example, a similar piece of pile fabric was padded through a bath so as to deposit 1.5% solids of the dispersion of the present invention based on the weight of the pile. The sample was then squeezed and dried. In the spraying example, the dispersion of the present invention was sprayed on the carpet so as to deposit 1.5% solids based on the weight of the pile, and was thereafter dried at 107° C.

| Method | Agent | Fiber | Soiling Index [1] | Hand |
|---|---|---|---|---|
| Exhaustion | $Al_2(SO_4)_3$ | Viscose | 0.54 | Std.[2] |
| Do | Cat. A | do | 0.62 | Sl: Softer. |
| Do | Cat. B | do | 0.60 | Do. |
| Do | Cat. C | do | 0.60 | Do. |
| Padding | | do | 0.76 | Sl: Harsher. |
| Spraying | | do | 0.77 | Do. |

[1] The lower the number the better the soil resistance.
[2] Std.—Standard. An assigned arbitrary value. Other hand values relative with respect thereto.

Cationic agent A referred to in the table is a reaction product of ethylene oxide with a mixture of octadecylamine salt of N-octadecyl carbamic acid and the octadecyl guanidine salt of N-octadecyl carbamic acid. Cationic agent B is an acid salt of a complex amino organic compound and cationic agent C is an alkylol substituted aliphatic guanidine aliphatic carbamate.

The soiling index is determined by taking a reflectance reading before and after soiling of similar pieces of treated and untreated carpeting. The reflectance reading number for the untreated soiled piece is then divided into the reflectance reading number for the treated soiled piece to arrive at a soiling index number. The treated and untreated pieces of carpeting were soiled according to the procedure set forth in Example 3 above.

An analysis of the above chart indicates that when exhaustion techniques are used, the soiling index is as much as .23 less than when conventional padding or spraying techniques are employed. In addition, it will be noted that the hand produced is softer when exhaustion techniques are used as compared with the hand achieved when conventional padding and spraying procedures are employed.

Regardless of the method of application, the treated fabric may be dried in a conventional manner in a heated chamber by tumble drying or other suitable means.

Generally, temperatures between 80 and 125° C. may be used and preferably temperatures of about 100° C. are employed. Lower temperatures are effective, but longer periods of time are required.

The soil retardant composition of the present invention may be applied with good results to fibers, yarns, threads, or fabric of wool, cotton, jute, viscose rayon, nylon, acrylics, polyesters and/or blends thereof.

As noted above, these compositions are effective in retarding the rate of soiling of many materials which are easily dirtied, such as wallpaper, lamp shades and painted surfaces. When the dispersion has a solids content of 20%, between 1⅓ and 6¾ ounces of such a dispersion per square yard of surface is adequate to provide a good soil retardant finish. For most purposes, about 3 ounces per square yard of such a dispersion is adequate. The dispersion may be applied to wallpaper or to a painted surface or the like by spraying, roller coating or brushing on, and allowed to dry at room temperature.

The composition of the present invention is compatible with a wide variety of wetting agents which is of particular importance when the material being treated is either wool or a very dense flannel-like material.

What is claimed is:

1. A process for preparing a stable aqueous dispersion comprising reacting in an aqueous medium a water-soluble aluminum salt and at least its stoichiometric equivalent of a water-soluble orthophosphate to produce a slurry containing an aluminum phosphate precipitate, filtering the precipitate, washing the filter cake with water in an amount between 10 and about 75% of the volume of the slurry, dispersing the filter cake in water by means of a water-soluble phosphate selected from the group consisting of a metaphosphate, a pyrophosphate and a polyphosphate, adjusting the pH of the dispersion to between 4 and 10.5 and thereafter milling the dispersion whereby a dispersion is provided, the major portion of the particles of which are 1.0 micron and less in diameter.

2. A stable, aqueous dispersion prepared in accordance with the process of claim 1.

3. A method of improving the soil resistant properties of pile fabric comprising treating said fabric with a composition comprising a stable, aqueous aluminum phosphate dispersion characterized by a pH of between 4 and 10.5 and by a major portion of the particles therein being 1 micron and less in diameter prepared in accordance with the process of claim 1, and a material adapted to render the fabric attractive to said aluminum phosphate dispersion particles so as to impart from between .25 and 5% solids from said dispersion onto said fabric, based on the weight of the fabric, said material adapted to render said fabric attractive to said dispersed aluminum phosphate particles being selected from the group consisting of aluminum sulfate and cationic wetting agents, and thereafter drying said treated piled fabric.

4. A process according to claim 3, in which the material adapted to render the fabric attractive to said dispersed aluminum phosphate particles is aluminum sulfate.

5. A process according to claim 3, in which the material adapted to render the fabric attractive to said dispersed aluminum phosphate particles is a cationic wetting agent.

6. A process for preparing a stable aqueous dispersion comprising reacting in an aqueous medium a water-soluble aluminum salt and at least its stoichiometric equivalent of a water-soluble orthophosphate, to produce a slurry containing an aluminum phosphate precipitate, dispersing the precipitate by means of a water-soluble phosphate selected from the group consisting of a metaphosphate, a pyrophosphate, and a polyphosphate, said dispersing phosphates being added in amounts sufficient to produce a dispersion and insufficient to prevent the formation of a precipitate, filtering the precipitate, washing the filter cake with water in an amount between 10 and about 75% of the volume of the slurry, dispersing the filter cake in water, adjusting the pH of the dispersion to between about 4 and 10.5 and thereafter milling the dispersion, whereby a dispersion is provided, the major portion of the particles of which are 1.0 micron and less in diameter.

7. A process for preparing a stable thixotropic dispersion comprising reacting in an aqueous medium a water-soluble aluminum salt selected from the group consisting of aluminum chloride and aluminum sulfate and at least its stoichiometric equivalent of a water-soluble orthophosphate, said orthophosphate being selected from the group consisting of trisodium phosphate and diammonium hydrogen phosphate, to produce a slurry containing an aluminum phosphate precipitate, dispersing the precipitate by means of a water-soluble phosphate selected from the group consisting of a metaphosphate, a pyrophosphate, and a polyphosphate, said dispersing phosphate being added in amounts sufficient to produce a dispersion and insufficient to prevent the formation of a precipitate, filtering the precipitate, washing the filter cake with water in an amount between 10 and about 75% of the volume of the slurry, dispersing the filter cake in water, adjusting the pH of the dispersion to between about 4 and 10.5, conferring thixotropy to the dispersion by the addition thereto of about 1% of a water-soluble inorganic salt of a metal selected from the group consisting of aluminum, magnesium, calcium, and zinc, and thereafter milling the dispersion, whereby a dispersion is provided, the major portion of the particles of which are 1.0 micron and less in diameter.

8. A stable, aqueous dispersion prepared in accordance with the process of claim 7.

9. A process for preparing a stable aqueous dispersion comprising reacting in an aqueous medium a water-soluble aluminum salt and at least the stoichiometric equivalent of a water-soluble orthophosphate, to produce a slurry containing an aluminum phosphate precipitate, dispersing the precipitate by means of from .15 to .80% based on the total weight of the slurry, of a water-soluble phosphate selected from the group consisting of a metaphosphate, a pyrophosphate, and a polyphosphate, filtering the precipitate, washing the filter cake with an amount of water equal to between 10 and 50% of the volume of the slurry, dispersing the filter cake in water, adjusting the pH of the dispersion to between about 5.5 and 8.5 and thereafter milling the dispersion whereby a dispersion is provided, the major portion of the particles of which are 1.0 micron and less in diameter.

10. A process for preparing a stable aqueous dispersion comprising reacting in an aqueous medium a water-soluble aluminum salt and at least the stoichiometric equivalent of a water-soluble orthophosphate, to produce a slurry containing an aluminum phosphate precipitate, dispersing the precipitate by means of from .40 to .70% based on the total weight of the slurry, of a water-soluble phosphate selected from the group consisting of a metaphosphate, a pyrophosphate, and a polyphosphate, adding to the slurry between ¾ and 1¼% based on the weight of the slurry, of a flocculating agent, filtering the slurry, washing the filter cake with an amount of water equal to between 10 and 50% of the volume of the slurry, dispersing the filter cake in water, adjusting the pH of the dispersion to between 5.5 and 8.5 and thereafter milling the dispersion, whereby a dispersion is provided, the major portion of the particles of which are 1.0 micron and less in diameter.

11. A process for preparing a stable aqueous dispersion comprising reacting in an aqueous medium aluminum chloride and at least its stoichiometric equivalent of diammonium hydrogen phosphate, to produce a slurry containing an aluminum phosphate precipitate, dispersing the precipitate by means of from .40 to .70% based on the total weight of the slurry of a metaphosphate, filtering the slurry, washing the filter cake with an amount of water equal to between 10 and 50% of the total volume of the slurry, dispersing the filter cake in an aqueous medium, adjusting the pH thereof to from between 5.5 and 8.5 and thereafter milling the dispersion, whereby a dispersion is provided, the major portion of the particles of which are 1.0 micron and less in diameter.

12. A process for preparing a stable thixotropic dispersion comprising reacting in an aqueous medium aluminum chloride and at least its stoichiometric equivalent of diammonium hydrogen phosphate to produce a slurry containing an aluminum phosphate precipitate, dispersing the precipitate by means of from .40 to .70% based on the total weight of the total slurry of a metaphosphate, flocculating the precipitate by the addition thereto of 1% of a flocculating agent consisting of a water-soluble inorganic salt of a metal selected from the group consisting of aluminum, magnesium, calcium and zinc, filtering the slurry, washing the filter cake with an amount of water equal to between 10 and 50% of the total volume of the slurry, dispersing the filter cake in an aqueous medium, adjusting the pH thereof to between 5.5 and 8.5, conferring thixotropy to the dispersion by the addition of about 1% of a water-soluble inorganic salt of a metal selected from the group consisting of aluminum, magnesium, calcium and zinc, and thereafter milling the dispersion, whereby a dispersion is provided, the major portion of the particles of which are 1.0 micron and less in diameter.

References Cited in the file of this patent

UNITED STATES PATENTS

| | | |
|---|---|---|
| 1,434,549 | Lewis | Nov. 7, 1922 |
| 2,186,095 | Booge et al. | Jan. 9, 1940 |
| 2,294,889 | Barol | Sept. 8, 1942 |
| 2,383,653 | Kirk | Aug. 28, 1945 |
| 2,408,656 | Kirk | Oct. 1, 1946 |
| 2,685,539 | Woodburn et al. | Aug. 3, 1954 |
| 2,693,427 | Kingsford | Nov. 2, 1954 |
| 2,734,834 | Rainard | Feb. 14, 1956 |
| 2,734,835 | Florio et al. | Feb. 14, 1956 |
| 2,786,787 | Florio | Mar. 26, 1957 |

FOREIGN PATENTS

| | | |
|---|---|---|
| 728,237 | Great Britain | Apr. 13, 1955 |